United States Patent
Chow et al.

(10) Patent No.: US 6,183,929 B1
(45) Date of Patent: Feb. 6, 2001

(54) FUNCTIONAL FUSING AGENT

(75) Inventors: Che C. Chow, Penfield; Samuel Kaplan, Walworth, both of NY (US)

(73) Assignee: Xerox Corporation, Stamford, CT (US)

(*) Notice: Under 35 U.S.C. 154(b), the term of this patent shall be extended for 0 days.

(21) Appl. No.: 09/365,453

(22) Filed: Aug. 2, 1999

(51) Int. Cl.[7] ............................................. G03G 13/20
(52) U.S. Cl. ........................................ 430/124; 399/333
(58) Field of Search ............................. 430/124; 399/333

(56) References Cited

U.S. PATENT DOCUMENTS

| | | | |
|---|---|---|---|
| 4,011,362 | 3/1977 | Stewart | 428/447 |
| 4,029,827 | 6/1977 | Imperial et al. | 427/22 |
| 4,046,795 | 9/1977 | Martin | 260/448.2 |
| 4,101,686 | 7/1978 | Strella et al. | 427/22 |
| 4,146,659 | 3/1979 | Swift et al. | 427/194 |
| 4,150,181 | 4/1979 | Smith | 427/444 |
| 4,185,140 | 1/1980 | Strella et al. | 428/418 |
| 4,515,884 | 5/1985 | Field et al. | 430/99 |
| 5,157,445 | 10/1992 | Shoji et al. | 355/284 |
| 5,395,725 | 3/1995 | Bluett et al. | 430/124 |
| 5,401,570 | 3/1995 | Heeks et al. | 428/332 |
| 5,493,376 | 2/1996 | Heeks | 355/284 |
| 5,512,409 | 4/1996 | Henry et al. | 430/124 |
| 5,516,361 | 5/1996 | Chow et al. | 106/2 |
| 5,531,813 | 7/1996 | Henry et al. | 106/2 |
| 5,864,740 | 1/1999 | Heeks et al. | 399/325 |
| 6,011,946 | * 1/2000 | Eddy et al. | 399/333 |

* cited by examiner

*Primary Examiner*—Mark Chapman
(74) *Attorney, Agent, or Firm*—Judith L. Byorick

(57) ABSTRACT

Disclosed is a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 5 mole percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.4 mole percent, wherein the mixture has a viscosity of from about 100 to about 1,000 centistokes, and wherein the ratio by weight of concentrate to diluent is from about 1:2 to about 1:30.

23 Claims, 3 Drawing Sheets

FUNCTIONAL FUSING AGENT

BACKGROUND OF THE INVENTION

The present invention is directed to improved amino-functional release agents for the fusing of electrostatic toner particles. More specifically, the present invention is directed to amino- and mercapto-functional release agents, and to fuser members coated or impregnated therewith, that exhibit advantages such as long fuser release life, good adhesion of articles such as 3M Post-It® notes to prints made therewith, and the like. One embodiment of the present invention is directed to a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 5 mole percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.4 mole percent, wherein the mixture has a viscosity of from about 100 to about 1,000 centistokes, and wherein the ratio by weight of concentrate to diluent is from about 1:2 to about 1:30.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which can be the photosensitive member itself, or some other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner to be bonded firmly to the support.

Typically, the thermoplastic resin particles are fused to the substrate by heating to a temperature of from about 90° C. to about 200° C. or higher, depending on the softening range of the particular resin used in the toner. It may be undesirable, however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat can be applied by heating one or both of the rolls, plate members, or belt members. Fusing of the toner particles occurs when the proper combination of heat, pressure, and/or contact for the optimum time period are provided. The balancing of these variables to bring about the fusing of the toner particles is well known in the art, and can be adjusted to suit particular machines or process conditions.

During the operation of one fusing system in which heat is applied to cause thermal fusing of the toner particles onto a support, both the toner image and the support are passed through a nip formed between a pair of rolls, plates, belts, or combination thereof. The concurrent transfer of heat and the application of pressure in the nip effects the fusing of the toner image onto the support. It is important in the fusing process that minimal or no offset of the toner particles from the support to the fuser member takes place during normal operations. Toner particles offset onto the fuser member can subsequently transfer to other parts of the machine or onto the support in subsequent copying cycles, thereby increasing the image background, causing inadequate copy quality, causing inferior marks on the copy, or otherwise interfering with the material being copied there as well as causing toner contamination of other parts of the machine. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release properties of the fuser member, and accordingly it is desirable to provide a fusing surface having a low surface energy to provide the necessary release.

To ensure and maintain good release properties of the fuser member, it has become customary to apply release agents to the fuser member during the fusing operation. Typically, these materials are applied as thin films of, for example, silicone oils, such as polydimethyl siloxane, or substituted silicone oils, such as amino-substituted oils, mercapto-substituted oils, or the like, to prevent toner offset. In addition, fillers can be added to the outer layers of fuser members to increase the bonding of the fuser oil to the surface of the fuser member, thereby imparting improved release properties.

The use of polymeric release agents having functional groups which interact with a fuser member to form a thermally stable, renewable self-cleaning layer having good release properties for electroscopic thermoplastic resin toners, is described in, for example, U.S. Pat. Nos. 4,029, 827, 4,101,686, and 4,185,140, the disclosures of each of which are totally incorporated herein by reference. Disclosed in U.S. Pat. No. 4,029,827 is the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids.

It is important to select the correct combination of fuser surface material, any filler incorporated or contained therein, and fuser oil. Specifically, it is important that the outer layer of the fuser member react sufficiently with the selected fuser oil to obtain sufficient release. To improve the bonding of fuser oils with the outer surface of the fuser member, fillers have been incorporated into or added to the outer surface layer of the fuser members, The use of a filler can aid in decreasing the amount of fusing oil necessary by promoting sufficient bonding of the fuser oil to the outer surface layer of the fusing member. It is important, however, that the filler not degrade the physical properties of the outer layer of the fuser member, and it is also important that the filler not cause too much of an increase in the surface energy of the outer layer.

Fillers are also sometimes added to the outer layers of fuser members to increase the thermal conductivity thereof. Examples of such fillers include conductive carbon, carbon black, graphite, titanium, and the like, as well as mixtures thereof. Efforts have been made to decrease the use of energy by providing a fuser member which has excellent thermal conductivity, thereby reducing the temperature needed to promote fusion of toner to paper. This increase in thermal conductivity also allows for increased speed of the fusing process by reducing the amount of time needed to heat the fuser member sufficiently to promote fusing. Efforts have also been made to increase the toughness of the fuser member layers to increase abrasion resistance and, accordingly, the life of the fuser member.

With regard to known fuser coatings, silicone rubber has been the preferred outer layer for fuser members in electrostatographic machines. Silicone rubbers interact well with various types of fuser release agents. Perfluoroalkoxypolytetrafluoroethylene (PFA Teflon), however, which is frequently used as an outer coating for fuser members, is more durable and abrasion resistant than silicone rubber coatings. Also, the surface energy for PFA Teflon is lower than that of silicone rubber coatings.

U.S. Pat. No. 5,864,740 (Heeks et al.), the disclosure of which is totally incorporated herein by reference, discloses a thermally stabilized silicone liquid composition and a toner fusing system using the thermally stabilized silicone liquid as a release agent, wherein the thermally stabilized silicone liquid contains a silicone liquid and a thermal stabilizer composition (including a reaction product from at least a polyorganosiloxane and a platinum metal compound (Group VIII compound) such as a ruthenium compound, excluding platinum.

U.S. Pat. No. 5,531,813 (Henry et al.), the disclosure of which is totally incorporated herein by reference, discloses a polyorgano amino functional oil release agent having at least 85 percent monoamino functionality per active molecule to interact with the thermally stable FKM hydrofluoroelastomer surface of a fuser member of an electrostatographic apparatus to provide an interfacial barrier layer to the toner and a low surface energy film to release the toner from the surface.

U.S. Pat. No. 5,516,361 (Chow et al.), the disclosure of which is totally incorporated herein by reference, discloses a fusing system, a method of fusing, and a fuser member having a thermally stable FKM hydrofluoroelastomer surface for fusing thermoplastic resin toners to a substrate in an electrostatographic printing apparatus, said fuser member having a polyorgano T-type amino functional oil release agent. The oil has predominantly monoamino functionality per active molecule to interact with the hydrofluoroelastomer surface to provide a substantially uniform interfacial barrier layer to the toner and a low surface energy film to release the toner from the surface.

U.S. Pat. No. 5,512,409 (Henry et al.), the disclosure of which is totally incorporated herein by reference, discloses a method of fusing thermoplastic resin toner images to a substrate in a fuser including a heated thermally stable FKM hydrofluoroelastomer fusing surface at elevated temperature prepared in the absence of anchoring sites for a release agent of heavy metals, heavy metal oxides, or other heavy metal compounds forming a film of a fluid release agent on the elastomer surface of an amino functional oil having the formula

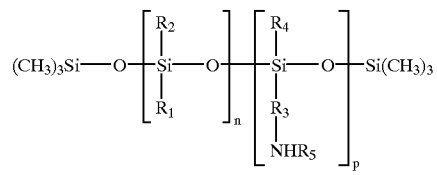

where $50 \geq n \geq 200$, p is 1 to 5, $R_1$, $R_2$, and $R_3$ are alkyl or arylalkyl radicals having 1 to 18 carbon atoms, $R_4$ is an alkyl or arylalkyl radical having 1 to 18 carbon atoms and a polyorganosiloxane chain having 1 to 100 diorganosiloxy repeat units, and $R_5$ is a hydrogen, alkyl, or arylalkyl radical having 1 to 18 carbon atoms, the oil having sufficient amino functionality per active molecule to interact with the hydrofluoroelastomer surface in the absence of a heavy metal and heavy metal anchoring sites to provide an interfacial barrier layer to the toner and a low surface energy film to release the toner from the surface. The process entails contacting the toner image on the substrate with the filmed heated elastomer surface to fuse the toner image to the substrate and permitting the toner to cool.

U.S. Pat. No. 5,493,376 (Heeks), the disclosure of which is totally incorporated herein by reference, discloses a thermally stabilized polyorganosiloxane oil including a polyorganosiloxane oil and, as the thermal stabilizer, the reaction product of chloroplatinic acid and a member selected from the group consisting of a cyclic polyorganosiloxane having the formula

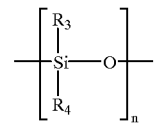

where $R_3$ is an alkyl radical having 1 to 6 carbon atoms and $R_4$ is selected from the group consisting of alkene and alkyne radicals having 2 to 8 carbon atoms, and n is from 3 to 6; a linear polyorganosiloxane having the formula

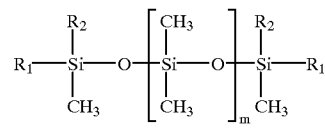

wherein $R_1$ and $R_2$ are selected from the group consisting of hydroxy and alkyl, alkoxy, alkene, and alkyne radicals having 1 to 10 carbon atoms, provided that at least one of $R_1$ and $R_2$ is alkene or alkyne, and m is from 0 to 50; and mixtures thereof, present in an amount to provide at least 5 parts per million of platinum in said oil.

U.S. Pat. No. 5,401,570 (Heeks et al.), the disclosure of which is totally incorporated herein by reference, discloses a fuser member comprising a substrate and thereover a silicone rubber containing a filler component therein, wherein the filler component is reacted with a silicone hydride release oil.

U.S. Pat. No. 5,395,725 (Bluett et al.), the disclosure of which is totally incorporated herein by reference, discloses a process for fusing toner images to a substrate which comprises providing a fusing member having a fusing surface; heating the fuser member to an elevated temperature to fuse toner to the substrate; and applying directly to the fusing surface a fuser release agent oil blend composition; wherein volatile emissions arising from the fuser release agent oil blend are minimized or eliminated.

U.S. Pat. No. 5,157,445 (Shoji et al.), the disclosure of which is totally incorporated herein by reference, discloses a fixing device where a copying medium carrying a nonfixed toner image thereon is passed between a pair of fixing rolls as being kept in direct contact with each other under pressure so as to fix the nonfixed toner image on the copying medium, the device being characterized in that a toner release at least containing, as an active ingredient, a functional group containing organopolysiloxane of the general formula

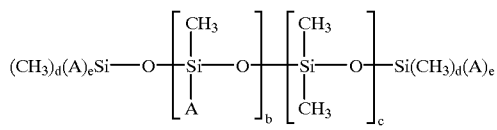

the organopolysiloxane having a viscosity of from 10 to 100,000 cs at 25° C., is supplied to at least the fixing roll of being brought into contact with the nonfixed toner image of the pair of fixing rolls. Using the toner release, the copying medium releasability from the fixing roll to which the toner release is applied is good and the heat resistance of the fixing roll is also good.

U.S. Pat. No. 4,515,884 (Field et al.), the disclosure of which is totally incorporated herein by reference, discloses the fusing of toner images to a substrate, such as paper, with a heated fusing member having a silicone elastomer fusing surface by coating the elastomer fusing surface with a toner release agent which includes an unblended polydimethyl siloxane having a kinematic viscosity of from about 7,000 to about 20,000 centistokes. In a preferred embodiment the polydimethyl siloxane oil has a kinematic viscosity of from about 10,000 to about 16,000 centistokes and the fuser member is a fuser roll having a thin layer of a crosslinked product of a mixture of $\alpha,\omega$-dihydroxypolydimethyl siloxane, finely divided tabular alumina, and finely divided iron oxide.

U.S. Pat. No. 4,185,140 (Strella et al.), the disclosure of which is totally incorporated herein by reference, discloses polymeric release agents having functional groups such as carboxy, hydroxy, epoxy, amino, isocyanate, thioether, or mercapto groups which are applied to a heated fuser member in an electrostatic reproducing apparatus to form thereon a thermally stable, renewable, self-cleaning layer having excellent toner release properties for conventional electroscopic thermoplastic resin toners. The functional polymeric fluids interact with the fuser member in such a manner as to form a thin, thermally stable interfacial barrier at the surface of the fuser member while leaving an outer film or layer of unreacted release fluid. The interfacial barrier is strongly attached to the fuser member surface and prevents electroscopic thermoplastic resin toner material from contacting the outer surface of the fuser member. The material on the surface of the fuser member is of minimal thickness and thereby represents a minimal thermal barrier.

U.S. Pat. No. 4,150,181 (Smith), the disclosure of which is totally incorporated herein by reference, discloses a contact fuser assembly and method for preventing toner offset on a heated fuser member in an electrostatic reproducing apparatus which includes a base member coated with a solid, abrasion resistant material such as polyimide, poly(amide-imides), poly(imide-esters), polysulfones, and aromatic polyamides. The fuser member is coated with a thin layer of polysiloxane fluid containing low molecular weight fluorocarbon. Toner offset on the heated fuser member is prevented by applying the polysiloxane fluid containing fluorocarbon to the solid, abrasion resistant surface of the fuser member.

U.S. Pat. No. 4,146,659 (Swift et al.), the disclosure of which is totally incorporated herein by reference, discloses fuser members having surfaces of gold and the platinum group metals and alloys thereof for fuser assemblies in office copier machines. Preferred fuser assemblies include cylindrical rolls having at least an outer surface of gold, a platinum group metal, or alloys thereof. Electroscopic thermoplastic resin toner images are fused to a substrate by using a bare gold, a platinum group metal, or alloys thereof fuser member coated with polymeric release agents having reactive functional groups, such as a mercapto-functional polysiloxane release fluid.

U.S. Pat. No. 4,101,686 (Strella et al.), the disclosure of which is totally incorporated herein by reference, discloses polymeric release agents having functional groups such as carboxy, hydroxy, epoxy, amino, isocyanate, thioether, or mercapto groups. The release agents are applied to a heated fuser member in an electrostatic reproducing apparatus to form thereon a thermally stable, renewable, self-cleaning layer having excellent toner release properties for conventional electroscopic thermoplastic resin toners. The functional polymeric fluids interact with the fuser member in such a manner as to form a thin, thermally stable interfacial barrier at the surface of the fuser member while leaving an outer film or layer of unreacted release fluid. The interfacial barrier is strongly attached to the fuser member surface and prevents electroscopic thermoplastic resin toner material from contacting the outer surface of the fuser member. the material on the surface of the fuser member is of minimal thickness and thereby represents a minimal thermal barrier.

U.S. Pat. No. 4,046,795 (Martin), the disclosure of which is totally incorporated herein by reference, discloses a process for preparing thiofunctional polysiloxane polymers which comprises reacting a disiloxane and/or a hydroxy or hydrocarbonoxy containing silane or siloxane with a cyclic trisiloxane in the presence of an acid catalyst wherein at least one of the organosilicon compounds contain a thiol group. These thiofunctional polysiloxane polymers are useful as metal protectants and as release agents, especially on metal substrates.

U.S. Pat. No. 4,029,827 (Imperial et al.), the disclosure of which is totally incorporated herein by reference, discloses polyorgano siloxanes having functional mercapto groups which are applied to a heated fuser member in an electrostatic reproducing apparatus to form thereon a thermally stable, renewable, self-cleaning layer having superior toner release properties for electroscopic thermoplastic resin toners. The polyorgano siloxane fluids having functional mercapto groups interact with the fuser member in such a manner as to form an interfacial barrier at the surface of the fuser member while leaving an unreacted, low surface energy release fluid as an outer layer or film. The interfacial barrier is strongly attached to the fuser member surface and prevents toner material from contacting the outer surface of the fuser member. the material on the surface of the fuser member is of minimal thickness and thereby represents a minimal thermal barrier The polyorgano siloxanes having mercapto functionality have also been effectively demonstrated as excellent release agents for the reactive types of toners having functional groups thereon.

U.S. Pat. No. 4,011,362 (Stewart), the disclosure of which is totally incorporated herein by reference, discloses metal substrates such as molds and fuser rolls which are coated with carboxyfunctional siloxanes to improve their release characteristics.

U.S. Pat. No. 3,731,358 (Artl), the disclosure of which is totally incorporated herein by reference, discloses a silicone rubber roll for pressure fusing of electrostatically produced and toned images at elevated temperatures. The roll inherently prevents offset of the image by supplying a release material to the surface of the roll. When the release material is depleted, the roll can be restored by impregnation with silicone oil.

U.S. Pat. No. 3,002,927 (Awe et al.), the disclosure of which is totally incorporated herein by reference, discloses organosilicon fluids capable of withstanding high temperatures which are prepared by preoxygenating the fluid by heating a mixture of (1) a polysiloxane fluid in which the siloxane units are selected from the group consisting of units of the formula $R_3SiO_{0.5}$, $R_2SiO$, $RSiO_{1.5}$, and $SiO_2$ in which each R is selected from the group consisting of methyl, phenyl, chlorophenyl, fluorophenyl, and bromophenyl radicals, (2) a ferric salt of a carboxylic acid having from 4 to 18 carbon atoms in an amount such that there is from 0.005 to 0.03 percent by weight iron based on the weight of (1), and (3) oxygen mechanically dispersed in the fluid at a temperature above 400° F. until the mixture changes to a reddish brown color and until the mixture will not form a precipitate when heated in the absence of oxygen at a temperature above that at which the preoxygenation step is carried out.

With regard to known fusing oils, silicone oil has been the preferred release agent for PFA Teflon coatings for fuser members. Release agents comprising silicone oil, however, do not provide sufficient release properties for toner because the silicone oil does not wet fuser coatings of PFA Teflon. Therefore, a large amount (greater than 5 mg/copy) of silicone oil is required to obtain minimum release performance. Alternatively, a large amount of wax must be incorporated into the toner in order to provide adequate release of the toner from the fuser member.

For other fluoropolymer, and especially flucoroelastomer, fuser member outer layers, amino silicone oil has been the release agent of choice, Amino oil, however, does not diffuse into paper products, but instead reacts with the cellulose in the paper and therefore remains on the surface of the paper. It is believed that hydrogen bonding occurs between the amine groups in the amino oil and the cellulose hydroxy groups of the paper. Alternatively, the amine groups can hydrolyze the cellulose rings in the paper. The amino oil on the surface of the copied paper prevents the binding of glues and adhesives, including attachable notes such as adhesive 3M Post-it® notes, to the surface of the copied paper. In addition, the amino silicone oil present on the surface of a copied paper prevents ink adhesion to the surface of the paper. This problem results in the poor fix of inks such as bank check endorser inks and other similar inks. Similar problems can also occur with mercapto-functional fusing oils, although such problems are usually observed to a lesser extent than with amino- functional fusing oils.

While known compositions and processes are suitable for their intended purposes, a need remains for improved fuser release agents. In addition, a need remains for fuser release agents that do not interact chemically with copy substrates such as paper. Further, a need remains for fuser release agents that enable the production of prints upon which adhesives such as those on 3M Post-It® notes adhere adequately. Additionally, a need remains for fuser release agents that enable the production of prints upon which inks such as check endorser MICR inks can print images of good quality and permanence. There is also a need for fuser release agents that enable the production of prints which can then be bound well with binder adhesives. In addition, there is a need for fuser release agents that form complete and uniform layers on fuser members having fluoropolymer surfaces. Further, there is a need for fuser release agents that enable long release life times for fuser members employed therewith. Additionally, there is a need for fuser release agents that have sufficient viscosity to be applied uniformly to a fuser member surface with a metering donor roll. A need also remains for fuser release agents that enable reduced or eliminated toner offset from the fuser member onto the copy substrate.

SUMMARY OF THE INVENTION

The present invention is directed to a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 5 mole percent, said concentrate having a viscosity of from about 50 to about 500 centistokes; and (b) a nonfunctional organosiloxcine polymer diluent, said diluent having a viscosity of from about 100 to about 2,000 centistokes; said mixture having a degree of functionality of from about 0.05 to about 0.4 mole percent, wherein the mixture has a viscosity of from about 100 to about 1,000 centistokes, and wherein the ratio by weight of concentrate to diluent is from about 1:2 to about 1:30.

DETAILED DESCRIPTION OF THE INVENTION

Figure 1:
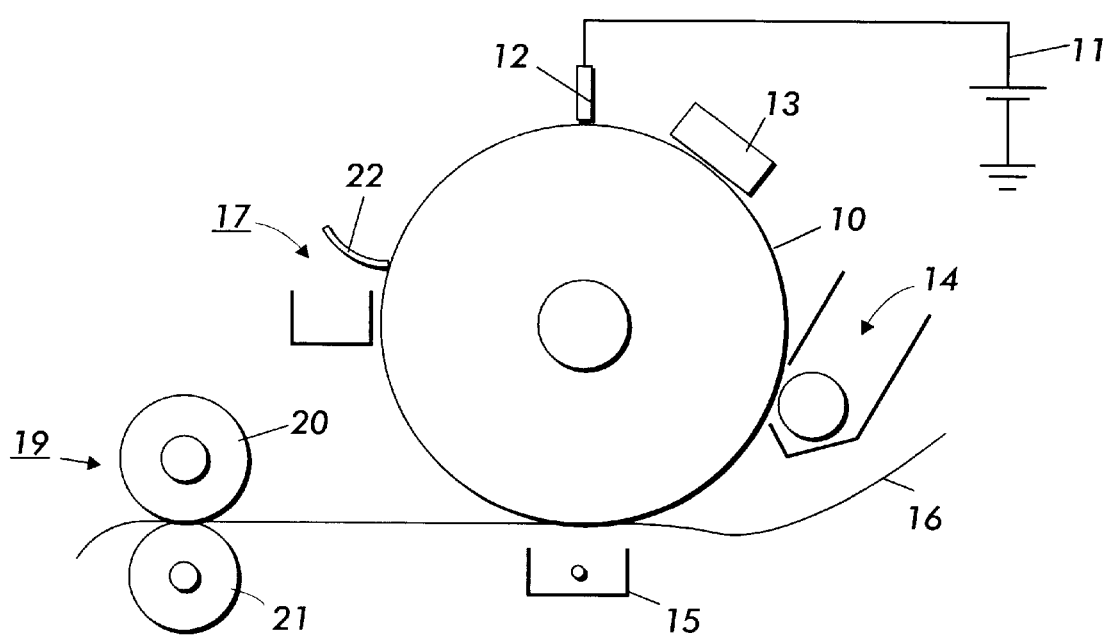
FIG. 1 is an illustration of a general electrostatographic apparatus.

Referring to FIG. 1, in a typical electrostatographic reproducing apparatus, a light image of an original to be copied is recorded in the form of an electrostatic latent image on a photosensitive member, and the latent image is subsequently rendered visible by the application of electroscopic thermoplastic resin particles, commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface in image configuration, they are transferred to a copy sheet 16 by transfer means 15, which can be pressure transfer, electrostatic transfer, or the like. Alternatively, the developed image can be transferred to an intermediate transfer member and subsequently transferred to a copy sheet.

After transfer of the developed image is completed, copy sheet 16 advances to fusing station 19, depicted in FIG. 1 as fusing and pressure rolls, wherein the developed image is fused to copy sheet 16 by passing copy sheet 16 between fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
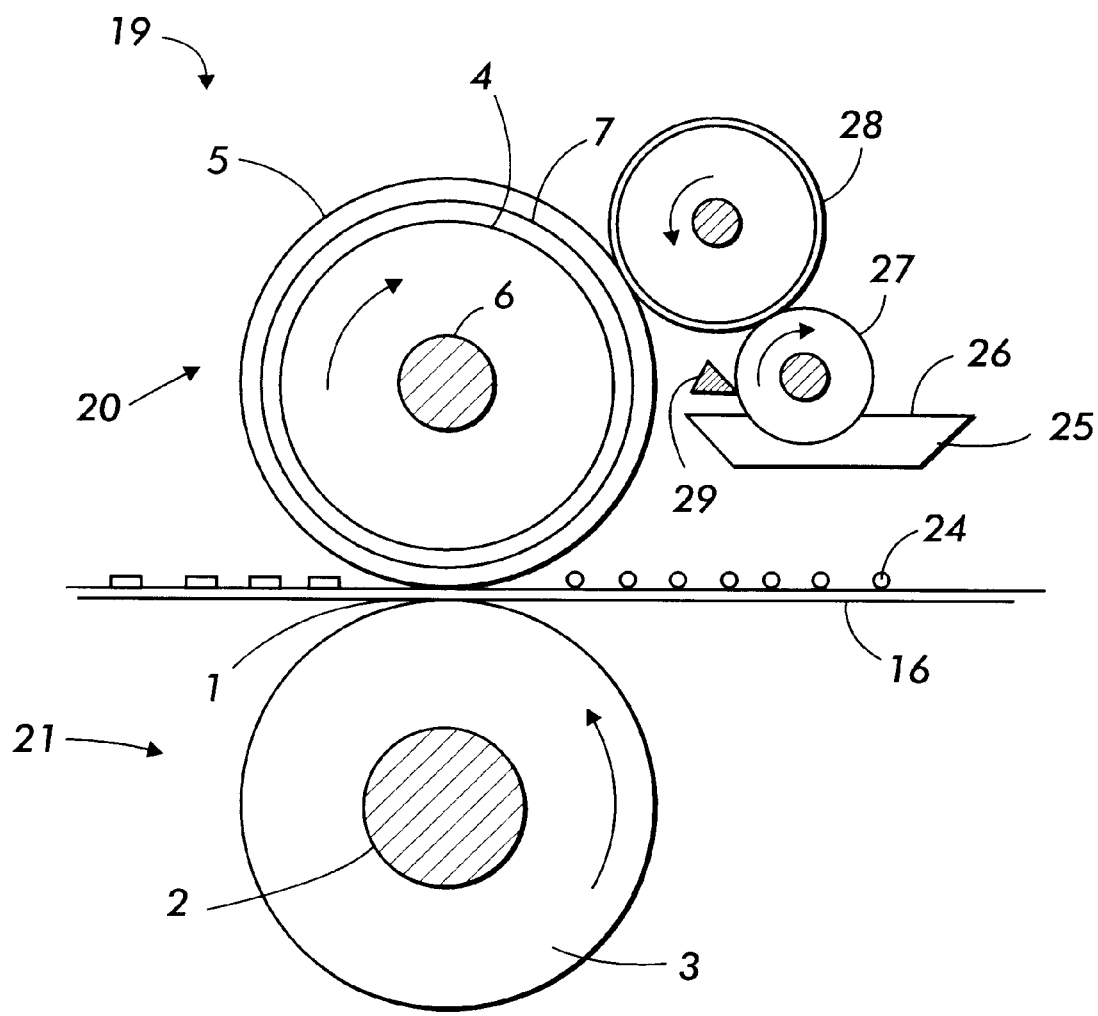
FIG. 2 illustrates a fusing system in accordance with an embodiment of the present invention.

Referring to FIG. 2, an embodiment of a fusing station 19 is depicted with an embodiment of a fuser roll 20 comprising polymer surface 5 on a suitable base member or substrate 4, which in this embodiment is a hollow cylinder or core fabricated from any suitable metal, such as aluminum, anodized aluminum, steel, nickel, copper, or the like, having a suitable heating element 6 disposed in the hollow portion thereof which is coextensive with the cylinder. The fuser member 20 optionally can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact polymer or elastomer surface 5 of fuser roll 20. As shown in FIG. 2, an embodiment of a backup roll or pressure roll 21 is depicted as having a rigid steel core 2 with a polymer or elastomer surface or layer 3 thereon. Sump 25 contains polymeric release agent 26, which may be a solid or liquid at room temperature, but is a fluid at operating temperatures, and, in fuser members of the present invention, is a mixture of an amino-substituted or mercapto-substituted organosiloxane polymer and a nonfunctional organosiloxane polymer. The pressure member 21 can also optionally include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5, Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicron thickness to thicknesses of several microns of release fluid. Thus, by metering device 29, preferably from about 0.1 to about 2 microns or greater thicknesses of release fluid can be applied to the surface of polymer or elastomer 5.

Figure 3:
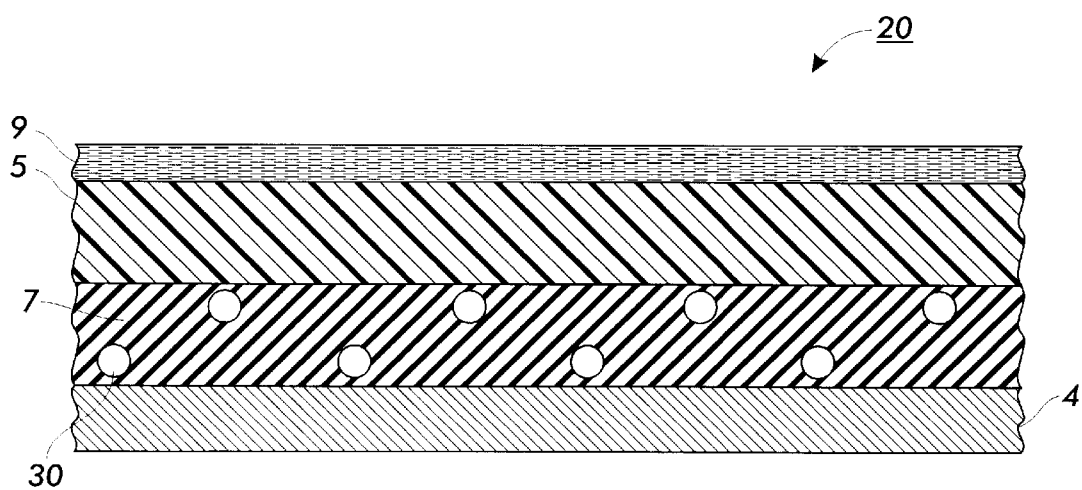
FIG. 3 demonstrates a cross-sectional view of an embodiment of the present invention.

FIG. 3 depicts a cross-sectional view of another embodiment of the invention, wherein fuser member 20 comprises substrate 4, optional intermediate surface layer 7 comprising silicone rubber and optional fillers 30, such as aluminum oxide or the like, dispersed or contained therein, and outer polymeric surface layer 5. FIG. 3 also depicts a fluid release agent or fusing oil layer 9 according to the present invention, comprising a mixture of an amino-substituted or mercapto-substituted organosiloxane polymer and a nonfunctional organosiloxane polymer.

The term "fuser member" as used herein refers to fuser members including fusing rolls, belts, films, sheets, and the like; donor members, including donor rolls, belts, films, sheets, and the like; and pressure members, including pressure rolls, belts, films, sheets, and the like; and other members useful in the fusing system of an electrostatographic or xerographic, including digital, machine. The fuser member of the present invention can be employed in a wide variety of machines, and is not specifically limited in its application to the particular embodiment depicted herein.

Any suitable substrate can be selected for the fuser member. The fuser member substrate can be a roll, belt, flat surface, sheet, film, or other suitable shape used in the fixing of thermoplastic toner images to a suitable copy substrate. It can take the form of a fuser member, a pressure member, or a release agent donor member, preferably in the form of a cylindrical roll. Typically, the fuser member is made of a hollow cylindrical metal core, such as copper, aluminum, stainless steel, or certain plastic materials chosen to maintain rigidity and structural integrity, as well as being capable of having a polymeric material coated thereon and adhered firmly thereto. It is preferred that the supporting substrate is a cylindrical sleeve, preferably with an outer polymeric layer of from about 1 to about 6 millimeters. In one embodiment, the core, which can be an aluminum or steel cylinder, is degreased with a solvent and cleaned with an abrasive cleaner prior to being primed with a primer, such as Dow Corning® 1200, which can be sprayed, brushed, or dipped, followed by air drying under ambient conditions for thirty minutes and then baked at 150° C. for 30 minutes.

Also suitable are quartz and glass substrates. The use of quartz or glass cores in fuser members allows for a light weight, low cost fuser system member to be produced. Moreover, the glass and quartz help allow for quick warm-up, and are therefore energy efficient. In addition, because the core of the fuser member comprises glass or quartz, there is a real possibility that such fuser members can be recycled. Moreover, these cores allow for high thermal efficiency by providing superior insulation.

When the fuser member is a belt, the substrate can be of any desired or suitable material, including plastics, such as Ultem®, available from General Electric, Ultrapek®, available from BASF, PPS (polyphenylene sulfide) sold under the tradenames Fortron®, available from Hoechst Celanese, Ryton R-4®, available from Phillips Petroleum, and Supec®, available from General Electric; PAI (polyamide imide), sold under the tradename Torlon® 7130, available from Amoco; polyketone (PK), sold under the tradename Kadel® E1230, available from Amoco; PI (polyimide); polyaramide; PEEK (polyether ether ketone), sold under the tradename PEEK 450GL30, available from Victrex; polyphthalamide sold under the tradename Amodel®, available from Amoco; PES (polyethersulfone); PEI (polyetherimide); PAEK (polyaryletherketone); PBA (polyparabanic acid); silicone resin; and fluorinated resin, such as PTFE (polytetrafluoroethylene); PFA (perfluoroalkoxy); FEP (fluorinated ethylene propylene); liquid crystalline resin (Xydar®), available from Amoco; and the like, as well as mixtures thereof. These plastics can be filled with glass or other minerals to enhance their mechanical strength without changing their thermal properties. In preferred embodiments, the plastic comprises a high temperature plastic with superior mechanical strength, such as polyphenylene sulfide, polyamide imide, polyimide, polyketone, polyphthalamide, polyether ether ketone, polyethersulfone, and polyetherimide. Suitable materials also include silicone rubbers. Examples of belt-configuration fuser members are disclosed in, for example, U.S. Pat. Nos. 5,487,707, and 5,514,436, and Copending application U.S. Ser. No. 08/297,203, filed Aug. 29, 1994, the disclosures of each of which are totally incorporated herein by reference. A method for manufacturing reinforced seamless belts is disclosed in, for example, U.S. Pat. No. 5,409,557, the disclosure of which is totally incorporated herein by reference.

The optional intermediate layer can be of any suitable or desired material. For example, the optional intermediate layer can comprise a silicone rubber of a thickness sufficient to form a conformable layer. Suitable silicone rubbers include room temperature vulcanization (RTV) silicone rubbers, high temperature vulcanization (HTV) silicone rubbers, and low temperature vulcanization (LTV) silicone rubbers. These rubbers are known and are readily available commercially such as SILASTIC® 735 black RTV and SILASTIC® 732 RTV, both available from Dow Corning, and 106 RTV Silicone Rubber and 90 RTV Silicone Rubber, both available from General Electric. Other suitable silicone materials include the silanes, siloxanes (preferably polydimethylsiloxanes), such as fluorosilicones, dimethylsilicones, liquid silicone rubbers, such as vinyl crosslinked heat curable rubbers or silanol room temperature crosslinked materials, and the like. Other materials suitable for the intermediate layer include polyimides and fluoroelastomers, including those set forth below. Optionally, fillers such as aluminum oxide or the like can be incorporated into the intermediate layer.

The optional intermediate layer typically has a thickness of from about 0.05 to about 10 millimeters, preferably from about 0.1 to about 5 millimeters, and more preferably from about 1 to about 3 millimeters, although the thickness can be outside of these ranges. More specifically, if the intermediate layer is present on a pressure member, it typically has a thickness of from about 0.05 to about 5 millimeters, preferably from about 0.1 to about 3 millimeters, and more preferably from about 0.5 to about 1 millimeter, although the thickness can be outside of these ranges. When present on a fuser member, the intermediate layer typically has a thickness of from about 1 to about 10 millimeters, preferably from about 2 to about 5 millimeters, and more preferably from about 2.5 to about 3 millimeters, although the thickness can be outside of these ranges. In a preferred embodiment, the thickness of the intermediate layer of the fuser member is higher than that of the pressure member, so that the fuser member is more deformable than the pressure member.

Examples of suitable outer fusing layers of the fuser member include polymers, such as fluoropolymers. Particularly useful fluoropolymer coatings for the present invention include TEFLON®-like materials such as polytetrafluoroethylene (PTFE), fluorinated ethylenepropylene copolymer (FE P), perfluorovinylalkylether tetrafluoroethylene copolymer (PFA TEFLON®), polyethersulfone, copolymers and terpolymers thereof, and the like. Also suitable are elastomers such as fluoroelastomers. Specifically, suitable fluoroelastomers are those described in, for example, U.S. Pat. Nos. 5,166,031, 5,281,506, 5,366,772, 5,370,931, 4,257, 699, 5,017,432, and 5,061,965, the disclosures of each of which are totally incorporated herein by reference. These fluoroelastomers, particularly from the class of copolymers, terpolymers, and tetrapolymers of vinylidene fluoride, hexafluoropropylene, and tetrafluoroethylene and a possible cure site monomer, are known commercially under various designations as VITON A®, VITON E®, VITON E60®, VITON E430®, VITON 910®, VITON GH®, VITON GF®, VITON E45®, VITON A201®, and VITON B50®. The VITON® designation is a Trademark of E. I. Du Pont de Nemours, Inc. Other commercially available materials include FLUOREL 2170®, FLUOREL 2174®, FLUOREL 2176®, FLUOREL 2177®, FLUOREL 2123®, and FLUOREL LVS 76®, FLUOREL® being a Trademark of 3M Company. Additional commercially available materials include AFLASTM, a poly(propylene-tetrafluoroethylene), and FLUOREL II® (LII900), a poly(propylene-tetrafluoroethylenevinylidenefluoride) elastomer, both also available from 3M Company, as well as the TECNOFLONS® identified as FOR-60KIR®, FOR-LHF®, NM®, FOR-THF®, FOR-TFS®, TH®, and TN505®, available from Montedison Specialty Chemical Company. Fluoropolymer, and especially fluoroelastomer, materials such as the VITON® materials, are beneficial when used as fuser roll coatings at normal fusing temperatures (e.g., from about 50 to about 150° C.). These materials have the superior properties of high temperature stability, thermal conduction, wear resistance, and release oil swell resistance.

TEFLON®-like materials such as polytetrafluoroethylene (PTFE), fluorinated ethylenepropylene copolymers (FEP), and perfluorovinylalkylether tetrafluoroethylene copolymers (PFA TEFLON®), such as polyfluoroalkoxypolytetrafluoroethylene, are often preferred because of their increased strength and lower susceptibility to stripper finger penetration. Further, these preferred polymers, in embodiments, can provide the ability to control microporosity, which further provides oil/film control. Other preferred outer surface layers include polymers containing ethylene propylene diene monomer (EPDM), such as those EPDM materials sold under the tradename NORDEL®, available from E. I. Du Pont de Nemours & Co., an example of which is NORDEL® 1440, and POLYSAR® EPDM 345, available from Polysar. In addition, preferred outer surface layers include butadiene rubbers (BR), such as BUDENE® 1207, available from Goodyear, butyl or halobutyl rubbers, such as, EXXON Butyl 365, POLYSAR Butyl 402, EXXON Chlorobutyl 1068, and POLYSAR Bromobutyl 2030. Polymers such as FKM materials (e.g., fluoroelastomers and silicone elastomers) are preferred for use in high temperature applications, and EPDM, BR, butyl, and halobutyl materials are preferred for use in low temperature applications, such as transfix and ink applications, and for use with belts.

In another embodiment, the polymer is a fluoroelastomer having a relatively low quantity of vinylidene fluoride, such as in VITON GF®, available from E. I. DuPont de Nemours, Inc. The VITON GF® has 35 percent by weight of vinylidene fluoride, 34 percent by weight of hexafluoropropylene, and 29 percent by weight of tetrafluoroethylene, with 2 percent by weight cure site monomer. The cure site monomer can be those available from Du Pont, such as 4-bromoperfluorobutene-1,1,1-dihydro-4-bromoperfluorobutene-1, 3-bromoperfluoropropene-1,1,1-dihydro-3-bromoperfluoropropene-1, or any other suitable cure site monomer. The fluorine content of the VITON GF® is about 70 percent by weight by total weight of fluoroelastomer.

In yet another embodiment, the polymer is a fluoroelastomer having relatively low fluorine content such as VITON A201C, which is a copolymer of vinylidene fluoride and hexafluoropropylene, having about 65 percent by weight fluorine content. This copolymer is compounded with crosslinkers and phosphonium compounds used as accelerators.

Particularly preferred for the present invention are the fluoroelastomers containing vinylidene fluoride, such as the VITON® materials. Most preferred are the vinylidene fluoride terpolymers such as VITON® GF.

It is preferred that the fluoroelastomer have a relatively high fluorine content of from about 65 to about 71 percent by weight, preferably from about 69 to about 70 percent by weight, and more preferably from about 70 percent fluorine by weight of total fluoroelastomer. Less expensive elastomers, such as some containing about 65 percent by weight fluorine, can also be used.

Other suitable fluoropolymers include those such as fluoroelastomer composite materials, which are hybrid polymers comprising at least two distinguishing polymer systems. blocks, or monomer segments, one monomer segment (hereinafter referred to as a "first monomer segment") that possesses a high wear resistance and high toughness, and the other monomer segment (hereinafter referred to as a "second monomer segment") that possesses low surface energy. The composite materials described herein are hybrid or copolymer compositions comprising substantially uniform, integral, interpenetrating networks of a first monomer segment and a second monomer segment, and in some embodiments, optionally a third grafted segment, wherein both the structure and the composition of the segment networks are substantially uniform when viewed through different slices of the fuser member layer. The term "interpenetrating network", in embodiments, refers to the addition polymerization matrix wherein the polymer strands of the first monomer segment and the second monomer segment, as well as those of the optional third grafted segment, are intertwined in one another. A copolymer composition, in embodiments, comprises a first monomer segment and a second monomer segment, as well as an optional third grafted segment, wherein the monomer segments are randomly arranged into a long chain molecule. Examples of polymers suitable for use as the first monomer segment or tough monomer segment include, for example, polyamides, polyimides, polysulfones, fluoroelastomers, and the like, as well as mixtures thereof. Examples of the low surface energy monomer segment or second monomer segment polymers include polyorganosiloxanes and the like, and also include intermediates that form inorganic networks. An intermediate is a precursor to inorganic oxide networks present in polymers described herein. This precursor goes through hydrolysis and condensation followed by the addition reactions to form desired network configurations of, for example, networks of metal oxides such as titanium oxide, silicon oxide, zirconium oxide, and the like; networks of metal halides; and networks of metal hydroxides. Examples of intermediates include metal alkoxides, metal halides, metal hydroxides, and polyorganosiloxanes. The preferred intermediates are alkoxides, and particularly preferred are tetraethoxy orthosilicate for silicon oxide networks and titanium isobutoxide for titanium oxide networks. In embodiments, a third low surface energy monomer segment is a grafted monomer segment and, in preferred embodiments, is a polyorganosiloxane. In these preferred embodiments, it is particularly preferred that the second monomer segment is an intermediate to a network of metal oxide. Preferred intermediates include tetraethoxy orthosilicate for silicon oxide networks and titanium isobutoxide for titanium oxide networks.

Also suitable are volume grafted elastomers. Volume grafted elastomers are a special form of hydrofluoroelastomer, and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in, for example, U.S. Pat. Nos. 5,166,031, 5,281,506, 5,366,772, and 5,370,931, the disclosures of each of which are totally incorporated herein by reference.

Examples of suitable polymer composites include volume grafted elastomers, titamers, grafted titamers, ceramers, grafted ceramers, polyamide-polyorganosiloxane copolymers, polyimide-polyorganosiloxane copolymers, polyester-polyorganosiloxane copolymers, polysulfone-polyorganosiloxane copolymers, and the like. Titamers and grafted titamers are disclosed in, for example, U.S. Pat. No. 5,486,987, the disclosure of which is totally incorporated herein by reference; ceramers and grafted ceramers are disclosed in, for example, U.S. Pat. No. 5,337,129, the disclosure of which is totally incorporated herein by reference; and volume grafted fluoroelastomers are disclosed in, for example, U.S. Pat. No. 5,366,772, the disclosure of which is totally incorporated herein by reference. In addition, these fluoroelastomer composite materials are disclosed in U.S. Pat. No. 5,778,290, the disclosure of which is totally incorporated herein by reference.

Other polymers suitable for use herein include silicone rubbers. Suitable silicone rubbers include room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC 732 RTV, both available from Dow Corning, and 106 RTV Silicone Rubber and 90 RTV Silicone Rubber, both available from General Electric. Further examples of silicone materials include Dow Corning SILASTIC® 590 and 591, Sylgard 182, and Dow Corning 806A Resin. Other preferred silicone materials include fluorosilicones, such as nonylfluorohexyl and fluorosiloxanes, including DC94003 and Q5-8601, both available from Dow Corning. Silicone conformable coatings, such as X3-6765, available from Dow Corning, are also suitable. Other suitable silicone materials include the siloxanes (preferably polydimethylsiloxanes), such as fluorosilicones, dimethylsilicones, liquid silicone rubbers (such as vinyl crosslinked heat curable rubbers or silanol room temperature crosslinked materials), and the like. Suitable silicone rubbers are available also from Wacker Silicones.

Conductive fillers can, optionally, be dispersed in the outer fusing layer of the fuser member, particularly in embodiments wherein a functional fuser oil is used. Preferred fillers are capable of interacting with the functional groups of the release agent to form a thermally stable film which releases the thermoplastic resin toner and prevents the toner from contacting the filler surface material itself. This bonding enables a reduction in the amount of oil needed to promote release. Further, preferred fillers promote bonding with the oil without causing problems such as scumming or gelling. In addition, it is preferred that the fillers be substantially non-reactive with the outer polymer material so that no adverse reaction occurs between the polymer material and the filler which would hinder curing or otherwise negatively affect the strength properties of the outer surface material. Fillers in the outer fusing layer can also increase thermal conductivity.

Other adjuvants and fillers can be incorporated in the polymer of the outer fusing layer according to the present invention, provided that they do not affect the integrity of the polymer material. Such fillers normally encountered in the compounding of elastomers include coloring agents, reinforcing fillers, processing aids, accelerators, and the like. Oxides, such as magnesium oxide, and hydroxides, such as calcium hydroxide, are suitable for use in curing many fluoroelastomers. Proton acids, such as stearic acid, are suitable additives in EPDM and BR polymer formulations to improve release by improving bonding of amino oils to the elastomer composition. Other metal oxides, such as cupric oxide and/or zinc oxide, can also be used to improve release. Metal oxides, such as copper oxide, aluminum oxide, magnesium oxide, tin oxide, titanium oxide, iron oxide, zinc oxide, manganese oxide, molybdenum oxide, and the like, carbon black, graphite, metal fibers and metal powder particles such as silver, nickel, aluminum, and the like, as well as mixtures thereof, can promote thermal conductivity. The addition of silicone particles to a fluoropolymer outer fusing layer can increase release of toner from the fuser member during and following the fusing process. Processability of a fluoropolymer outer fusing layer can be increased by increasing absorption of silicone oils, in particular by adding fillers such as fumed silica or clays such as organomontmorillonites. Inorganic particulate fillers can increase the abrasion resistance of the polymeric outer fusing layer. Examples of such fillers include metal-containing fillers, such as a metal, metal alloy, metal oxide, metal salt, or other metal compound; the general classes of suitable metals include those metals of Groups 1b, 2a, 2b, 3a, 3b, 4a, 4b, 5a, 5b, 6b, 7b, 8, and the rare earth elements of the Periodic Table. Specific examples of such fillers are oxides of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel, and alloys thereof. Also suitable are reinforcing calcined alumina and non-reinforcing tabular alumina.

The polymer layers of the fuser member can be coated on the fuser member substrate by any desired or suitable means, including normal spraying, dipping, and tumble spraying techniques. A flow coating apparatus as described in Copending application U.S. Ser. No. 08/672,493 filed Jun. 26, 1996, entitled "Flow Coating Process for Manufacture of Polymeric Printer Roll and Belt Components," the disclosure of which is totally incorporated herein by reference, can also be used to flow coat a series of fuser rolls. It is preferred that the polymers be diluted with a solvent, and particularly an environmentally friendly solvent, prior to application to the fuser substrate. Alternative methods, however, can be used for coating layers, including methods described in Copending application U.S. Ser. No. 09/069,476, filed Apr. 29, 1998, entitled "Method of Coating Fuser Members," the disclosure of which is totally incorporated herein by reference.

Other optional layers, such as adhesive layers or other suitable cushion layers or conductive layers, can also be incorporated between the outer polymer layer and the substrate. Optional intermediate adhesive layers and/or polymer layers can be applied to achieve desired properties and performance objectives. An adhesive intermediate layer can be selected from, for example, epoxy resins and polysiloxanes. Preferred adhesives include materials such as THIXON 403/404, Union Carbide A-1100, Dow TACTIX 740, Dow TACTIX 741, Dow TACTIX 742, Dow Corning P5200, Dow Corning S-2260, Union Carbide A-1100, and United Chemical Technologies A0728. A particularly preferred curative for the aforementioned adhesives is Dow H41. Preferred adhesive(s) for silicone adhesion are A4040 silane, available from Dow Corning Corp., Midland, Mich. 48686, D.C. 1200, also available from Dow Corning, and S-11 silane, available from Grace Specialty Polymers, Lexington, Mass. Adhesion of fluorocarbon elastomers can be accomplished with Chemlok® 5150, available from Lord Corp., Coating and Lamination Division, Erie, Pa.

Polymeric fluid release agents can be used in combination with the polymer outer layer to form a layer of fluid release agent, which results in an interfacial barrier at the surface of the fuser member while leaving a non-reacted low surface energy release fluid as an outer release film. Suitable release agents include both functional and non-functional fluid release agents. The term "nonfunctional oil" as used herein refers to oils which do not contain organic functional groups on the backbone or pendant groups on the siloxane polymer which can react chemically with the fillers on the surface of the fuser member or the polymer matrix which comprises the top layer of the fuser member. The term "functional oil" as used herein refers to a release agent having functional groups which can react chemically with the fillers present on the surface of the fuser member or the polymer matrix which comprises the top layer of the fuser member so as to reduce the surface energy of the fillers and thereby provide better release of toner particles from the surface of the fuser member. The polymeric release agents of the present invention are mixtures of unsubstituted or nonfunctional organosiloxane polymers and amino- or mercapto-substituted organosiloxane polymers.

Preferred unsubstituted organosiloxane polymers include those of the general formula

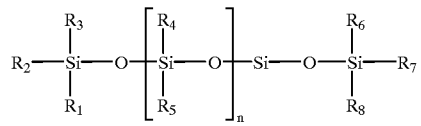

wherein each of $R_1$, $R_2$, $R_3$, $R_4$, $R_5$, $R_6$, $R_7$, and $R_8$, independently of the others, is an alkyl group, including linear, branched, cyclic, unsaturated, and substituted alkyl groups, typically with from 1 to about 18 carbon atoms, preferably with from 1 to about 8 carbon atoms, more preferably with from 1 to about 6 carbon atoms, and even more preferably with from 1 to about 3 carbon atoms, although the number of carbon atoms can be outside of these ranges, an aryl group, including substituted aryl groups, typically with from 6 to about 18 carbon atoms, preferably with from 6 to about 10 carbon atoms, and even more preferably with from 6 to about 8 carbon atoms, although the number of carbon atoms can be outside of this range, or an arylalkyl group (with either the alkyl or the aryl portion of the group being attached to the silicon atom), including substituted arylalkyl groups, typically with from 7 to about 18 carbon atoms, preferably with from 7 to about 12 carbon atoms, and more preferably with from 7 to about 9 carbon atoms, although the number of carbon atoms can be outside of these ranges, wherein at least one of $R_4$, and $R_5$ can, if desired, also be a polyorganosiloxane chain with from 1 to about 100 repeat diorganosiloxane monomer units, and wherein the substituents on the substituted alkyl, aryl, or arylalkyl groups do not include functional groups such as amino groups, mercapto groups, hydride groups, or other groups that react chemically with the fillers on the surface of the fuser member or with the polymer matrix that comprises the top layer of the fuser member. Further, n is an integer representing the number of repeat monomer units: typically, n is from about 50 to about 5,000, although the number of repeat monomer units can be outside of this range. These polymers generally are random copolymers of siloxane repeat units, although alternating, graft, and block copolymers are also suitable. In one preferred embodiment, all of the R groups are methyl groups. Specific examples of suitable materials of this formula include poly (dimethylsiloxanes), of the general formula

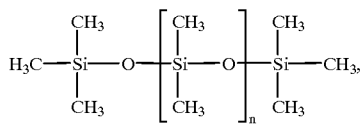

poly(phenylmethylsiloxanes), of the general formula

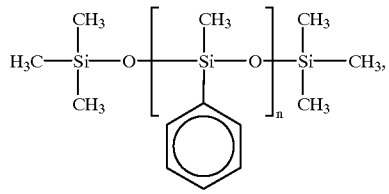

dimethylsiloxane/phenylmethylsiloxane random copolymers, of the general formula

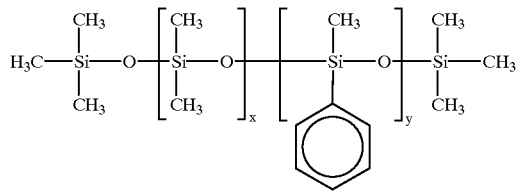

wherein x and y are integers representing the number of repeat monomer units, poly(silylphenylenes), of the general formula

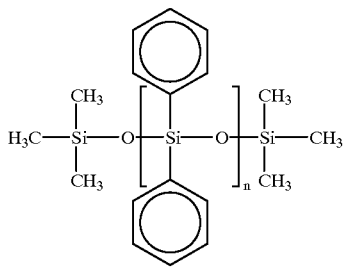

wherein n is an integer representing the number of repeat monomer units, dimethyl siloxane/diphenyl siloxane random copolymers, of the general formula

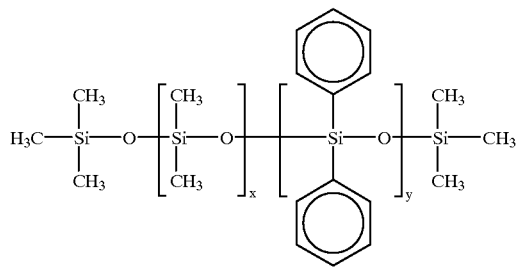

wherein x and y are integers representing the number of repeat monomer units, and the like. Materials of these formula are commercially available from, for example Dow Corning Co., Midland, Mich., United Chemical Technologies, Piscataway, N.J., and the like. T-Type non-functional silicone oils are also suitable for the present invention.

The nonfunctional organosiloxane polymer is of any suitable or desired effective weight average molecular weight, typically from about 5,000 to about 50,000, and preferably from about 10,000 to about 25,000, although the weight average molecular weight can be outside of these ranges.

The nonfunctional organosiloxane polymer generally has a viscosity at about 25° C. of from about 100 to about 2,000 centistokes, and preferably from about 500 to about 1,000 centistokes, although the viscosity can be outside of these ranges.

The concentrate comprising the amino-substituted or mercapto-substituted organosiloxane polymer has amino or mercapto functional groups pendant from at least some of the polymer molecules therein. Specific examples of suitable amino functional silicone oils include T-Type amino functional silicone release agents, as disclosed in, for example U.S. Pat. No. 5,516,361, monoamino functional silicone release agents, as described in, for example U.S. Pat. No. 5,531,813, and amino functional siloxane release agents, as disclosed in, for example, U.S. Pat. No. 5,512,409, the disclosures of each of which are totally incorporated herein by reference. Specific examples of suitable mercapto functional silicone oils include those disclosed in, for example, U.S. Pat. No. 4,029,827, the disclosure of which is totally incorporated herein by reference. Other functional silicone oils include those described in, for example, U.S. Pat. Nos. 4,101,686, 4,146,659, and 4,185,140, the disclosures of each of which are totally incorporated herein by reference. Other release agents include those described in, for example, U.S. Pat. Nos. 4,515,884 and 5,493,376, the disclosures of each of which are totally incorporated herein by reference.

Examples of preferred amino-substituted and mercapto-substituted organosiloxane polymers are of the general formula

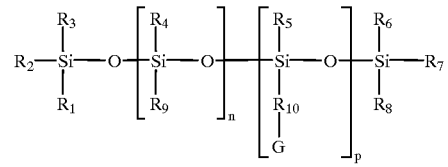

wherein G is —$NHR_{11}$ or —SH, each of $R_1$, $R_2$, $R_3$, $R_4$, $R_5$, $R_6$, $R_7$, $R_8$, and $R_9$ independently of the others, is an alkyl group, including linear, branched, cyclic, and unsaturated alkyl groups, typically with from 1 to about 18 carbon atoms, preferably with from 1 to about 8 carbon atoms, more preferably with from 1 to about 6 carbon atoms, and even more preferably with from 1 to about 3 carbon atoms, although the number of carbon atoms can be outside of these ranges, an aryl group, including substituted aryl groups, typically with from 6 to about 18 carbon atoms, preferably with from 6 to about 10 carbon atoms, and even more preferably with from 6 to about 8 carbon atoms, although the number of carbon atoms can be outside of this range, or an arylalkyl group (with either the alkyl or the aryl portion of the group being attached to the silicon atom), including substituted arylalkyl groups, typically with from 7 to about 18 carbon atoms, preferably with from 7 to about 12 carbon atoms, and more preferably with from 7 to about 9 carbon atoms, although the number of carbon atoms can be outside of these ranges, wherein at least one of $R_4$, $R_5$, and $R_9$ can, if desired, also be a polyorganosiloxane chain with from 1 to about 100 repeat diorganosiloxane monomer units, $R_{10}$ is an alkyl or arylalkyl group, the alkyl group, including linear, branched, cyclic, and unsaturated alkyl groups, typically with from 1 to about 18 carbon atoms, preferably with from 1 to about 8 carbon atoms, more preferably with from 1 to about 6 carbon atoms, even more preferably with from 1 to about 3 carbon atoms, and most preferably with about 3 carbon atoms, such as an n-propyl group, although the number of carbon atoms can be outside of these ranges, the arylalkyl group (with either the alkyl or the aryl portion of the group being attached to the silicon atom), including substituted arylalkyl groups, typically with from 7 to about 18 carbon atoms, preferably with from 7 to about 12 carbon atoms, and more preferably with from 7 to about 9 carbon atoms, although the number of carbon atoms can be outside of these ranges, and $R_{11}$ is a hydrogen atom, an alkyl group, or an arylalkyl group, the alkyl group, including linear, branched, cyclic, and unsaturated alkyl groups, typically with from 1 to about 18 carbon atoms, preferably with from 1 to about 8 carbon atoms, more preferably with from 1 to about 6 carbon atoms, and even more preferably with from 1 to about 3 carbon atoms, although the number of carbon atoms can be outside of these ranges, the arylalkyl group (with either the alkyl or the aryl portion of the group being attached to the silicon atom), including substituted arylalkyl groups, typically with from 7 to about 18 carbon atoms, preferably with from 7 to about 12 carbon atoms, and more preferably with from 7 to about 9 carbon atoms, although the number of carbon atoms can be outside of these ranges. Further, p and n are each integers representing the number of repeat monomer units; typically, p is from 0 to about 5 and n is from about 50 to about 5,000, although the number of repeat monomer units can be outside of this range. In the concentrate of the present invention, the mole percent of amino or mercapto substituents typically is from about 0.2 to about 5 mole percent, although the mole percentage of functional groups can be outside of this range. In one specific embodiment of the present invention, in the concentrate, the mole percent of amino substituents typically is from about 0.2 to about 2 mole percent, and preferably from about 0.5 to about 1 mole percent, i.e., the value of $$\frac{p}{n+p}$$

typically is from about 0.002 to about 0.02, and preferably is from about 0.005 to about 0.01, although the mole percentage of amino functional groups can be outside of these ranges. In another specific embodiment of the present invention, in the concentrate, the mole percent of mercapto substituents typically is from about 0.5 to about 5 mole percent, and preferably from about 1 to about 3 mole percent, i.e., the value of $$\frac{p}{n+p}$$

typically is from about 0.005 to about 0.05, and preferably is; from about 0.01 to about 0.03, although the mole percentage of amino functional groups can be outside of these ranges. These numbers represent the amount of functional groups present in the concentrate relative to the number of organosiloxane (—$SiR_2$—) groups present in the concentrate. It will be appreciated that some individual polymer molecules in the concentrate may have no functional substituents thereon, and that some individual polymer molecules in the concentrate may have 2, 3, 4, 5, or more functional substituents thereon. These polymers generally are random copolymers of substituted and unsubstituted siloxane repeat units, although alternating, graft, and block copolymers are also suitable. In one preferred embodiment, $R_1$, $R_2$, $R_3$, $R_4$, $R_5$, $R_6$, $R_7$, $R_8$, and $R_9$ are all methyl groups. T-Type amino-substituted organosiloxane polymers are also suitable.

The amino-substituted or mercapto-substituted organosiloxane polymer is of any suitable or desired effective weight average molecular weight, typically from about 4,000 to about 20,000, and preferably from about 12,000 to about 18,000, although the weight average molecular weight can be outside of these ranges.

The amino-substituted or mercapto-substituted organosiloxane polymer generally has a viscosity at about 25° C. of from about 50 to about 500 centistokes, and preferably from about 300 to about 400 centistokes, although the viscosity can be outside of these ranges.

The diluent comprising the nonfunctional organosiloxane polymer and the concentrate comprising the amino-substituted or mercapto-substituted organosiloxane polymer are generally present in the mixture of the present invention in relative amounts by weight of from about 1 part concentrate per about 2 parts diluent to about 1 part concentrate per about 30 parts diluent, and preferably from about 1 part concentrate per about 3 parts diluent to about 1 part concentrate per about 10 parts diluent, although the relative amounts of these components can be outside of these ranges.

The resulting mixture typically has a viscosity at about 25° C. of from about 100 to about 1,000 centistokes, and preferably from about 400 to about 800 centistokes, although the viscosity can be outside of these ranges.

In the mixture of the present invention, the mole percent of amino or mercapto substituents typically is from about 0.05 to about 0.4 percent. In one specific embodiment of the present invention, in the mixture, the mole percent of amino substituents typically is from about 0.05 to about 0.2 mole percent, and preferably from about 0.06 to about 0.12 percent, i.e., the value of $$\frac{p}{n+p}$$

typically is from about 0.0005 to about 0.002, and preferably is from about 0.0006 to about 0.0012, although the mole percentage of amino functional groups can be outside of these ranges. In another specific embodiment of the present invention, in the mixture, the mole percent of mercapto substituents typically is from about 0.1 to about 0.4 mole percent, and preferably from about 0.15 to about 0.3 percent, i.e., the value of $$\frac{p}{n+p}$$

typically is from about 0.001 to about 0.004, and preferably is from about 0,0015 to about 0.003, although the mole percentage of mercapto functional groups can be outside of these ranges. These numbers represent the amount of functional groups present in the mixture of concentrate and diluent relative to the number of organosiloxane (—$SiR_2$—) groups present in the mixture. It will be appreciated that some individual polymer molecules in the mixture may have no functional substituents thereon, and that some individual polymer molecules in the mixture may have 2, 3, 4, 5, or more functional substituents thereon.

The release agents comprising the mixture of concentrate and diluent of the present invention remain functionally fluid at temperatures typically of up to about 500° F., and preferably from about 30 to about 450° F., although the temperatures at which the release agents are functionally fluid can be outside of this range.

Preferably, the release agent forms a continuous film on the polymer surface of the fuser member. The silicone oils of the present invention typically are supplied in an amount of from about 0.1 to about 20 microliters per copy, preferably from about 2 to about 15 microliters per copy, and more preferably from about 5 to about 12 microliters per copy, although the amount can be outside of these ranges.

Amino-substituted organosiloxane polymers having a viscosity of about 350 centistokes at about 25° C. and an amine concentration of about 0.15 mole percent, when coated onto fluoropolymers commonly used as fuser member outer layers and used to fuse electrostatic toner images to print substrates such as paper, typically exhibit disadvantages such as poor adhesion of 3M Post-It® notes, poor ink adhesion to the surface of the paper subsequent to fusing, poor fix of inks such as bank check endorser inks and other similar inks to the fused paper, and the like. When amino-substituted organosiloxane polymers having a viscosity of about 100 centistokes at about 25° C. and an amine concentration of about 0.15 mole percent are employed under similar conditions, the adhesion of Post-It® notes to the resulting prints is substantially improved. The release life of the fuser member, however, is significantly decreased when used in conjunction with the 100 centistoke viscosity release agent. When a mixture of concentrate containing an amino-substituted organosiloxane polymer having a viscosity of from about 50 to about 500 centistokes at about 25° C. and an amine concentration of from about 0.2 to about 2 mole percent is admixed with a nonfunctional organosiloxane polymer having a viscosity of from about 100 to about 2,000 centistokes at about 25° C., the resulting mixture, which generally has a viscosity of from about 100 to about 1,000 centistokes at about 25° C. and an amine concentration of from about 0.05 to about 0.2 mole percent, improved adhesion of Post-It® notes to the prints is observed, and release life of the fuser is also desirably high.

While not being limited to any particular theory, it is believed that lower viscosity fusing oils diffuse into paper faster than higher viscosity fusing oils of the same composition, all conditions being equal, and that functional fusing oils diffuse into paper more slowly than nonfunctional fusing oils of the same composition, all conditions being equal; in the instant invention, it is believed that the diluent portion of the mixture, i.e., the high viscosity nonfunctional oil, diffuses into paper faster than the concentrate portion of the mixture, i.e., the low viscosity amino or mercapto functional oil. Accordingly, any low viscosity functional fusing agent molecules chemisorbed onto the paper surface provide insufficient coverage to impair the adhesion of Post-It® notes to the prints, since the low viscosity amino-substituted polymer diffuses into the paper faster than would a similar functional fusing oil of high viscosity. Again, while not being limited to any particular theory, it is believed that the increased release life observed with the mixtures of the present invention, compared to a similar blend containing a low viscosity concentrate and a low viscosity diluent, results from improved hydrodynamics of the fusing agent metering system (such as a donor roll or the like). More specifically, it is believed that when one or more dust particles, toner particles, paper particles, or the like are trapped under a metering blade, the fusing agent level in that region of the fuser member is depleted when a low viscosity fusing agent is employed; the depleted fusing agent level on the fuser member promotes toner offset, which can be invisible initially, but will later accelerate to visible offset. Specific offset observed with the low viscosity fusing release agent generally begins as a fine streak less than one millimeter in width, and then grows in width as more streaks appear. In contrast, with the mixtures making up the fusing release agents of the present invention, the level of fusing agent on the fuser member is substantially more uniform, and offset is not observed until many more copies have been made, said offset appearing as a spot.

The present invention is also directed to a process which comprises (i) generating an electrostatic latent image on an imaging member; (ii) developing the latent image by contacting the imaging member with a developer; (iii) transferring the developed image to a copy substrate; and (iv) affixing the developed image to the copy substrate by contacting the developed image with a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 2 mole percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.21 mole percent, wherein the mixture has a viscosity of from about 100 to about 1,000 centistokes, and wherein the ratio by weight of concentrate to diluent is from about 1:2 to about 1:30. Examples of suitable substrates include (but are not limited to) plain papers such as Xerox® 4024 papers, ruled notebook paper, bond paper, silica coated papers such as Sharp Company silica coated paper, Jujo paper, and the like, transparency materials, fabrics, textile products, plastics, polymeric films, inorganic substrates such as metals and wood, and the like.

The present invention also encompasses an image forming apparatus for forming images on a recording medium which comprises: (i) a charge-retentive surface capable of receiving an electrostatic latent image thereon; (ii) a development assembly to apply toner to the charge-retentive surface, thereby developing the electrostatic latent image to form a developed image on the charge retentive surface; (iii) a transfer assembly to transfer the developed image from the charge retentive surface to a copy substrate; and (iv) a fixing assembly to fuse toner images to a surface of the copy substrate, wherein the fixing assembly includes a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 2 mole percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.21 mole percent, wherein the mixture has a viscosity of from about 100 to about 1,000 centistokes, and wherein the ratio by weight of concentrate to diluent is from about 1:2 to about 1:30.

An additional embodiment of the present invention is directed to a process for improving adhesion to a fused print substrate and for improving fuser oil release life which comprises (i) generating an electrostatic latent image on an imaging member, (ii) developing the latent image by contacting the imaging member with a developer; (iii) transferring the developed image to a copy substrate; and (iv) affixing the developed image to the copy substrate by contacting the developed image with a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 2 mole percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.21 mole percent, wherein the mixture has a viscosity of from about 100 to about 1,000 centistokes, and wherein the ratio by weight of concentrate to diluent is from about 1:2 to about 1:30.

A further embodiment of the present invention is directed to a process for simultaneously obtaining acceptable to a fused print substrate and obtaining acceptable fuser oil release life which comprises (i) generating an electrostatic latent image on an imaging member; (ii) developing the latent image by contacting the imaging member with a developer; (iii) transferring the developed image to a copy substrate; and (iv) affixing the developed image to the copy substrate by contacting the developed image with a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 2 mole percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.21 mole percent, wherein the mixture has a viscosity of from about 100 to about 1,000 centistokes, and wherein the ratio by weight of concentrate to diluent is from about 1:2 to about 1:30.

Specific embodiments of the invention will now be described in detail. These examples are intended to be illustrative, and the invention is not limited to the materials, conditions, or process parameters set forth in these embodiments. All parts and percentages are by weight unless otherwise indicated.

Release Life Testing: The described fusing release agents were evaluated on a three inch bench web fixture, the web continuously running at 20 centimeters per second. The fuser roll coating comprised 1.5 millimeters of a thermally conductive silicone rubber with a release overcoat of 0.050 millimeter Viton GF cured with the E. I. DuPont de Nemours and Co. VC-50 curing system. The Viton GF layer contained no heavy metals, heavy metal oxides, or other metal compounds. The fuser roll was 50 millimeters in diameter and was operated at 20 centimeters per second surface speed and at a run temperature of 360° F., which is 30° F. above the temperature at which image fix becomes acceptable. A polyester toner was used for the image, and the image coverage was 50 percent. The amount of toner as the image on the paper carrier was 1.0 milligrams per square centimeter. The toner contained the proper amount of Aerosil (obtained from Cabot Corp.) to promote toner flow and a charge control agent to provide the necessary triboelectric charging characteristics for toner development. Failure, in this instance, hot offset, occurred when part of the toner image became attached to the fuser roll and was then transferred to the paper on the next revolution of the fuser roll. For the tests described herein, 500,000 prints was considered to be an acceptable release life.

Sample Generation: A Xerox® 5775 fuser roll was hand rubbed with oil soaked in a paper towel, and the oil rate on the first copy was typically from about 10 to about 20 milligrams (1 milligram=1 microliter) per copy. Without further oil addition, the oil rate dropped on successive copies. Copies were selected with the desired oil rate of 3 to 5 milligrams per copy. There were no toner images on all of the peel force test samples. The paper used was Xerox® Image Series LX and peel force measurements were performed on the felt side of the paper.

Oil-On-Copy: Since the pressure roll was engaged part of the time to help distribute the oil on the fuser roll, the pressure roll became coated with oil. In addition, the interdocument gap also allowed oil transfer between the fuser roll and the pressure roll. The amount of oil transferred from the pressure roll to the copy was unknown but could be significant, especially in the first few copies. To eliminate this ambiguity, double sheets of paper were used in all samples generated for adhesion measurements, with the back sheet discarded. Thus, the oil measured subsequently by solvent extraction came only from the front side of the copy. The oil rates reported here are scaled to 8.5 inch by 11 inch size paper.

Adhesive: For the peel force measurements a 3M® #658 adhesive tape was used. This 1 inch wide paper tape had the same adhesive as that coated on 3M Post-it® notes. About 3.5 inches was used for each measurement, thereby increasing significantly the peel length and accuracy of the peel force measurement by averaging the peel force.

Adhesion Process: The adhesion developed was very sensitive to the force applied in bringing the adhesive and paper together. To minimize any random error in this sensitive factor, a rubber coated steel roller that complied with the Pressure Sensitive Tape Council test procedure PSTC-1 for adhesive tapes, was employed.

Peel Force Measurement: Peel force measurements were performed with the Slip/Peel Tester model 3M90 made by Instrumentors, Inc. According to the manufacturer, the strain gauge was accurate to 1 gram of force. The instantaneous peel force was printed on a chart recorder for visual averaging over the test duration. The peel angle was 180° with respect to the paper surface. For consistent results, the adhesive was applied 5 minutes after print generation and peel force measurements made 5 minutes later.

For reference, the peel force required to separate the adhesive from Xerox® Image Series LX paper without any applied oil was measured to be about 124 grams per centimeter.

The following examples are tests of various types of amino functional silicone oil release agents with differing viscosities or a mixture of viscosities used in the above experiments. All fluids were obtained from Dow Corning Corporation.

EXAMPLE I

500 centiStoke Nonfunctional Silicone Oil

A 500 centiStoke nonfunctional silicone fluid, with an oil application rate of 5 milligrams per print, produced hot offset after only some tens of prints, because of the absence of amine groups to bond to the Viton® surface. Paper coated with this oil by the above described procedure at application rates of 3 and 5 milligrams per print demonstrated peel force values of 52 and 38 grams per centimeter, respectively, when subjected to the peel force test described above.

EXAMPLE II

350 centiStoke Amino Functional Silicone Oil

A 350 centiStoke amino functional silicone oil containing 0.6 mole percent pendant propylamine groups (concentrate) was blended with 350 centiStoke nonfunctional silicone oil (diluent) at a ratio by weight of 1 part amine-functional fluid to 3.6 parts nonfunctional fluid to produce a fluid containing 0.13 mole percent amine groups. An amino oil mixture made according to this procedure, when utilized in the above described test with an oil application rate of 5 milligrams per print, yielded no hot offset after 500,000 prints, at which time point testing was suspended. Paper coated with this oil, by the above-described procedure at application rates of 3 and 5 milligrams per print, demonstrated peel force values of 12 and 8 grams per centimeter, respectively, when subjected to the peel force test described above. These peel force values are unacceptably low.

EXAMPLE III

100 centiStoke Amino Functional Silicone Oil

A 100 centiStoke amino functional silicone oil containing 0.6 mole percent pendant propylamine groups (concentrate) was blended with 100 centiStoke nonfunctional silicone oil (diluent) at a ratio by weight of 1 part amine-functional fluid to 3.6 parts nonfunctional fluid to produce a fluid containing 0.13 mole percent amine groups. An amino oil mixture made according to this procedure, when utilized in the above described test with an oil application rate of 3 milligrams per print, produced hot offset failure at 200,000 prints. This fuser lifetime is unacceptably low. Paper coated with this oil by the above-described procedure at application rates of 3 and 5 milligrams per print demonstrated peel force values of 26 and 16 grams per centimeter, respectively, when subjected to the peel force test described above. These peel force values are significantly higher than those achieved from the 350 centiStoke fluid of Example I. Release life, however, was considerably reduced.

EXAMPLE IV

Mixed Viscosity Amino Functional Silicone Oil

A 100 centiStoke amino functional silicone oil containing 0.6 mole percent pendant propylamine groups (concentrate) was blended with 500 centiStoke nonfunctional silicone oil (diluent) at a ratio by weight of 1 part amine-functional fluid to 3.6 parts nonfunctional fluid to produce a 350 centiStoke fluid containing 0.13 mole percent amine groups. An amino oil mixture made according to this procedure, when utilized in the above described test, with an oil application rate of 5 milligrams per print, produced no hot offset failure after 500,000 prints. Paper coated with this oil by the above-described procedure at application rates of 3 and 5 milligrams per print demonstrated peel force values of 21 and 10 grams per centimeter, respectively, when subjected to the peel force test described above. The peel force values obtained from this mixed viscosity oil were only slightly inferior to that of the 100 centiStoke fluid, which was applied at a lower oil rate. Yet, the mixed viscosity fluid was able to achieve the required release life of 500,000 prints, a result similar to that obtained with the 350 centiStoke fluid of Example II and significantly better release life than the 100 centiStoke fluid of Example III. Accordingly, the mixed viscosity fluid simultaneously achieved both acceptable Post-It® adhesion and acceptable fuser release life.

EXAMPLE V

The processes of Examples I through IV are repeated except that a mercapto functional polysiloxane oil is substituted for the amino functional polysiloxane oil. It is believed that improved adhesion of Post-It® notes and acceptable fuser release life will be observed.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 5 mole percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.4 mole percent, wherein the mixture has a viscosity of from about 100 to about 1,000 centistokes, and wherein the ratio by weight of concentrate to diluent is from about 1:2 to about 1:30.

2. A fuser member according to claim 1 wherein the mixture has a viscosity of from about 400 to about 800 centistokes.

3. A fuser member according to claim 1 wherein the mixture contains amino-functional organosiloxane polymers and has a degree of amino functionality of from about 0.05 to about 0.2 mole percent.

4. A fuser member according to claim 1 wherein the mixture contains amino-functional organosiloxane polymers and has a degree of amino functionality of from about 0.06 to about 0.12 mole percent.

5. A fuser member according to claim 1 wherein the mixture contains mercapto-functional organosiloxane polymers and has a degree of mercapto functionality of from about 0.1 to about 0.4 mole percent.

6. A fuser member according to claim 1 wherein the mixture contains mercapto-functional organosiloxane polymers and has a degree of mercapto functionality of from about 0.15 to about 0.3 mole percent.

7. A fuser member according to claim 1 wherein the amino-substituted or mercapto-substituted organosiloxane polymer is of the formula

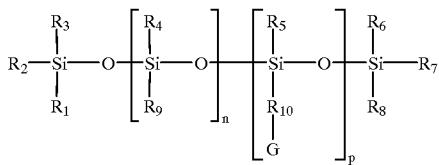

wherein G is —$NHR_{11}$, or —SH, each of $R_1$, $R_2$, $R_3$, $R_4$, $R_5$, $R_6$, $R_7$, $R_8$, and $R_9$, independently of the others, are alkyl groups or arylalkyl groups, $R_{10}$ is an alkyl group or an arylalkyl group, $R_{11}$ is a hydrogen atom, an alkyl group, or an arylalkyl group, and n and p are each integers representing the number of repeat monomer units.

8. A fuser member according to claim 1 wherein the nonfunctional organosiloxane polymer is of the formula

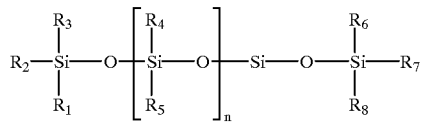

wherein each of $R_1$, $R_2$, $R_3$, $R_4$, $R_5$, $R_6$, $R_7$, and $R_8$, independently of the others, is an alkyl group, an aryl group, or an arylalkyl group, and n is an integer representing the number of repeat monomer units.

9. A fuser member according to claim 1 wherein the nonfunctional organosiloxane polymer component of the release agent has a weight average molecular weight of from about 5,000 to about 50,000.

10. A fuser member according to claim 1 wherein the diluent component of the release agent has a viscosity of from about 500 to about 1,000 centistokes.

11. A fuser member according to claim 1 wherein the concentrate contains amino-functional organosiloxane polymers and has a degree of amino functionality of from about 0.2 to about 2 mole percent.

12. A fuser member according to claim 1 wherein the concentrate contains amino-functional organosiloxane polymers and has a degree of amino functionality of from about 0.5 to about 1 mole percent.

13. A fuser member according to claim 1 wherein the concentrate contains mercapto-functional organosiloxane polymers and has a degree of mercapto functionality of from about 0.5 to about 5 mole percent.

14. A fuser member according to claim 1 wherein the concentrate contains mercapto-functional organosiloxane polymers and has a degree of mercapto functionality of from about 1 to about 3 mole percent.

15. A fuser member according to claim 1 wherein the amino-substituted or mercapto-substituted organosiloxane polymer component of the release agent has a weight average molecular weight of from about 4,000 to about 20,000.

16. A fuser member according to claim 1 wherein the concentrate component of the release agent has a viscosity of from about 300 to about 400 centistokes.

17. A fuser member according to claim 1 wherein the ratio by weight of concentrate to the diluent is from about 1:3 to about 1:10.

18. A fuser member according to claim 1 wherein the polymer in the layer overlying the substrate is a fluoropolymer.

19. A process which comprises (i) generating an electrostatic latent image on an imaging member; (ii) developing the latent image by contacting the imaging member with a developer; (iii) transferring the developed image to a copy substrate; and (iv) affixing the developed image to the copy substrate by contacting the developed image with a fuser member according to claim 1.

20. A process according to claim 19 wherein the copy substrate is paper.

21. An image forming apparatus for forming images on a recording medium which comprises: (i) a charge-retentive surface capable of receiving an electrostatic latent image thereon; (ii) a development assembly to apply toner to the charge-retentive surface, thereby developing the electrostatic latent image to form a developed image on the charge retentive surface; (iii) a transfer assembly to transfer the developed image from the charge retentive surface to a copy substrate; and (iv) a fixing assembly to fuse toner images to a surface of the copy substrate, wherein the fixing assembly includes a fuser member according to claim 1.

22. A process for improving adhesion to a fused print substrate and for improving fuser oil release life which comprises (i) generating an electrostatic latent image on an imaging member; (ii) developing the latent image by contacting the imaging member with a developer; (iii) transferring the developed image to a copy substrate; and (iv) affixing the developed image to the copy substrate by contacting the developed image with a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 5 mole percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.4 mole percent, wherein the mixture has a viscosity of from about 100 to about 1,000 centistokes, and wherein the ratio by weight of concentrate to diluent is from about 1:2 to about 1:30.

23. A process for simultaneously obtaining acceptable adhesion to a fused print substrate and obtaining acceptable fuser oil release life which comprises (i) generating an electrostatic latent image on an imaging member, (ii) developing the latent image by contacting the imaging member with a developer; (iii) transferring the developed image to a copy substrate; and (iv) affixing the developed image to the copy substrate by contacting the developed image with a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said concentrate having a degree of functionality of from about 0.2 to about 5 mole percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.4 mole percent, wherein the mixture has a viscosity of from about 100 to about 1,000 centistokes, and wherein the ratio by weight of concentrate to diluent is from about 1:2 to about 1:30.

* * * * *